(12) United States Patent
Marchesan

(10) Patent No.: US 8,721,185 B2
(45) Date of Patent: May 13, 2014

(54) CONSTRUCTIVE ARRANGEMENT ADDED TO A SUPPORT FOR ASSEMBLING AGRICULTURAL TILTING BEARINGS

(76) Inventor: Joao Carlos Marchesan, Matao (BR)

( * ) Notice: Subject to any disclaimer, the term of this patent is extended or adjusted under 35 U.S.C. 154(b) by 0 days.

(21) Appl. No.: 13/096,633

(22) Filed: Apr. 28, 2011

(65) Prior Publication Data

US 2012/0272516 A1 Nov. 1, 2012

(30) Foreign Application Priority Data

Oct. 28, 2010 (BR) .................................. 9001952 U

(51) Int. Cl.
*B23P 19/00* (2006.01)
(52) U.S. Cl.
USPC .......................................................... 384/428
(58) Field of Classification Search
USPC .................. 384/428, 434–440, 442–444; 248/226.11, 230.1, 230.6, 231.71, 200
See application file for complete search history.

(56) References Cited

U.S. PATENT DOCUMENTS

| | | | | | |
|---|---|---|---|---|---|
| 3,265,344 | A | * | 8/1966 | Ornstein | 248/243 |
| 5,320,307 | A | * | 6/1994 | Spofford et al. | 244/54 |
| 5,873,547 | A | * | 2/1999 | Dunstan | 244/54 |
| 5,979,846 | A | * | 11/1999 | Fluhr | 248/200 |
| 6,682,015 | B2 | * | 1/2004 | Levert et al. | 244/54 |
| 8,152,094 | B2 | * | 4/2012 | Foster | 244/54 |
| 2005/0178936 | A1 | * | 8/2005 | Chen | 248/230.1 |

* cited by examiner

*Primary Examiner* — Alan B Waits
*Assistant Examiner* — Brian McGovern
(74) *Attorney, Agent, or Firm* — Alston & Bird LLP

(57) ABSTRACT

Constructive arrangement added to a support for assembling agricultural tilting bearings with new constructive form applied to the assembly support, which comprises the arrangement of multiple and contiguous openings practiced on its upper portion, so as to allow the use, in different diameters and different inter centers, of fastening elements. Alternatively, the multiple openings can be of analogous conformation and not contiguous, so as to allow the desirable interchangeability among different brands and models of agricultural equipment. The new constructive form of the support foresees the arrangement of hollow ears at opposite side ends, and also the arrangement of openings practiced on its lower ends, preferably with recesses tied in one of the ends of the fastening methods for their retention at the tilting bearing.

9 Claims, 2 Drawing Sheets

CONSTRUCTIVE ARRANGEMENT ADDED TO A SUPPORT FOR ASSEMBLING AGRICULTURAL TILTING BEARINGS

CROSS-REFERENCE TO RELATED APPLICATION

This application claims priority to and the benefit of the filing date of Brazilian Application MU9001952-0, entitled entitled Constructive Arrangement Added to Support for Assembling Agricultural Tilting Bearings, filed on Oct. 28, 2010, which is hereby incorporated herein in its entirety by reference.

FIELD

The subject matter refers to agricultural tilting bearings used in diverse agricultural pieces of equipment, which have the revolving arrangement of the active bodies in the structure of said pieces of equipment which directly work at the cutting and tilling of the soil. More specifically, the present invention refers to the constructive arrangement provided to the support for assembling these bearings in the structure of the agricultural pieces of equipment.

BACKGROUND

Agricultural pieces of equipment of different models, especially those aimed at preparing the soil, such as levelling harrows, disc harrows, terracing plows and the like, constitute a class of pieces of equipment which bear high loads and operate under several field conditions, which results in intense efforts in both directions, radial and axial. The use of agricultural tilting bearings, such as described in Brazilian Application MU8402968-4, due to the form of assembling them in the structure of the equipment, allows significantly absorbing part of these efforts, especially due to the natural resilience observed in the shaft of the section of discs during the work, whereas it minimizes the negative effects of impacts directly on the structure of the equipment. Therefore, the tilting bearings allow the sections of discs to rotate more freely, with less effort of friction and greater durability of the bearing's internal components. However, it happens that the agricultural tilting bearings existing at the market base themselves on the construction and the specific use at certain projects of each manufacturer of these pieces of equipment, according to their form and fastening methods at the sections of discs and the structure of the equipment.

The specificity verified in current projects on tilting bearings and the pieces of equipment bearing them has been a relevant factor in the low dissemination and use of said bearings. It is quite desirable that these bearings have high level of interchangeability among different products and also among different manufacturers, so that their replacement is made easier even in pieces of equipment which have fastening elements of different sizes.

PURPOSES OF THE INVENTION

In a detailed analysis of the topic and seeking to use the maximum potential provided by the tilting bearings, especially the greater durability of them and of the pieces of equipment bearing them, the applicant added new constructive arrangements to said assembly support, as further described and illustrated.

Therefore, one of the purposes of this invention is to provide a broad possibility of exchange in the use of tilting bearings at the agricultural pieces of equipment known at the market and usually comprised by rigid bearings.

Additionally, another purpose of this invention is to provide the possibility of occasional use of a known accessory, such as the cover of protection against wear, also at the tilting bearings, in whose new constructive shape the developed support has an arrangement for said purpose.

DESCRIPTION OF THE FIGURES

The attached figures illustrate the new arrangement added to a support of agricultural titling bearings and contain references which highlight the distinction and better use of the present subject matter.

DETAILED DESCRIPTION

Figure 1:
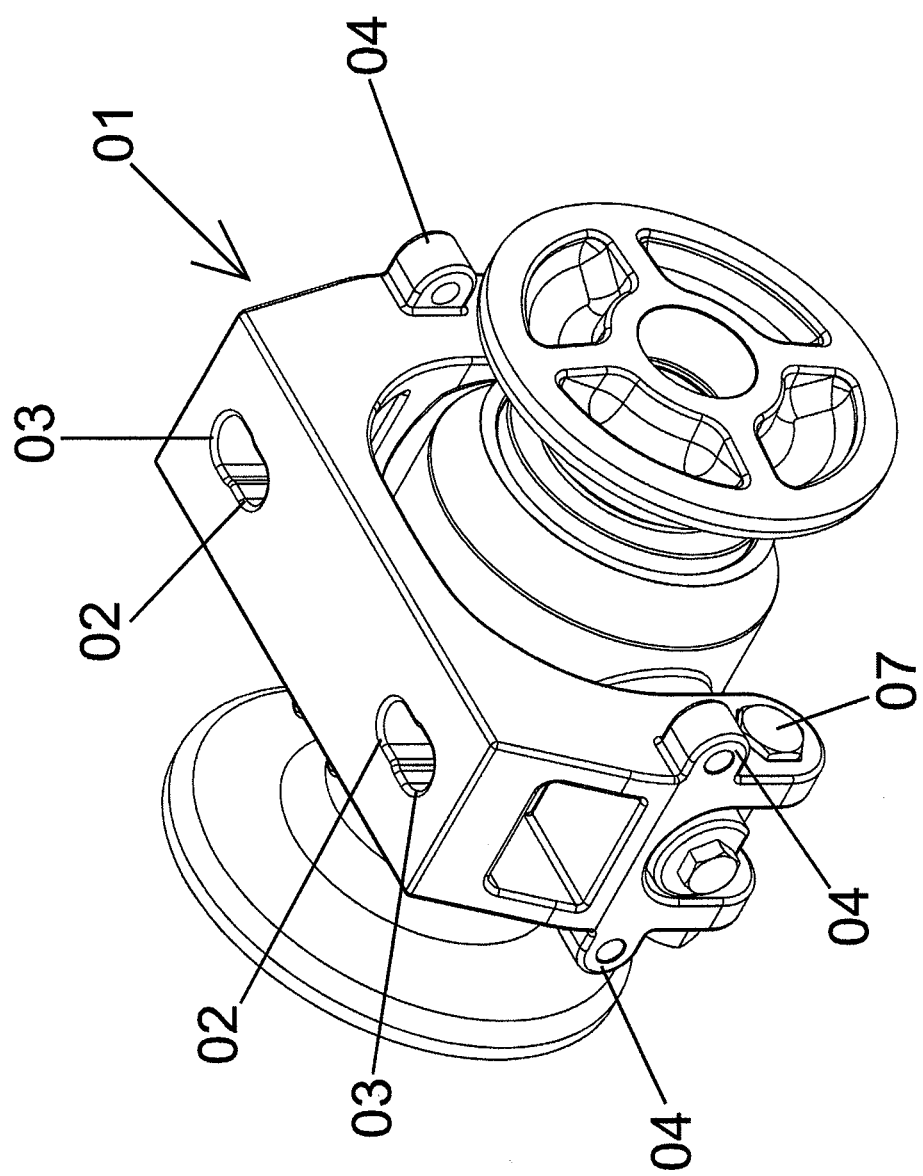
FIG. 1 is a perspective view of the agricultural tilting bearing equipped with an embodiment of a support according to the present invention.
Figure 2:
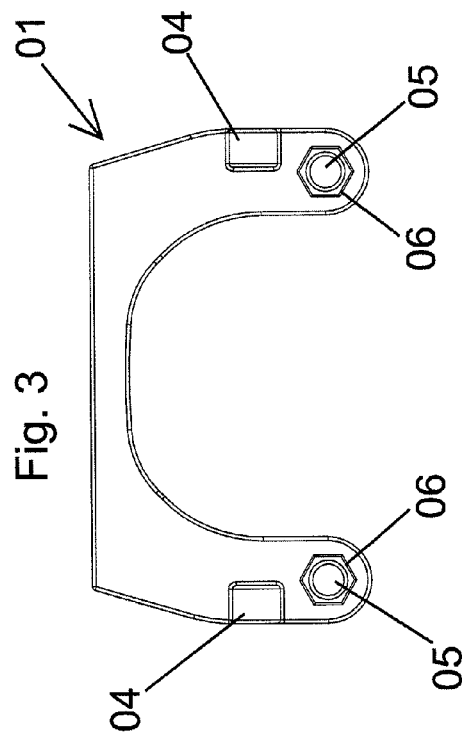
FIG. 2 is a perspective view of the embodiment of a support according to the present invention.
Figure 3:
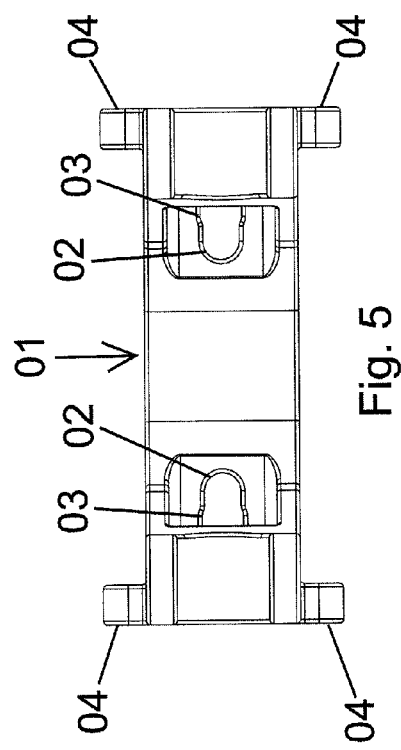
FIG. 3 is a side elevation view of the embodiment of a support according to the present invention.
Figure 4:
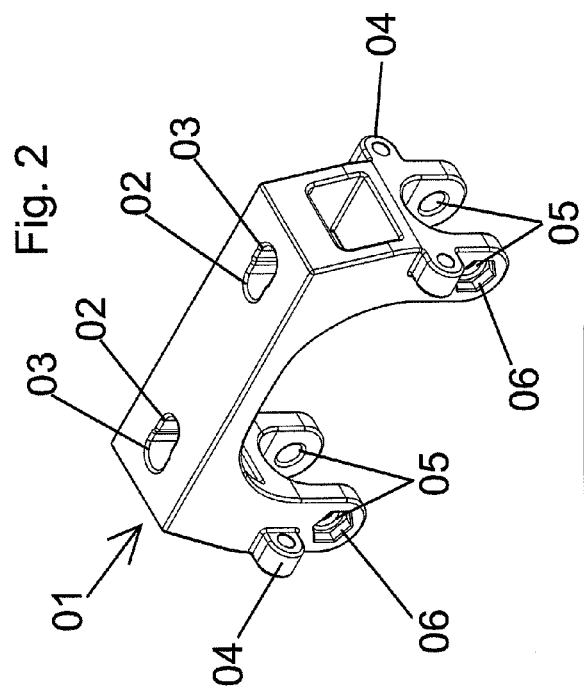
FIG. 4 is a front elevation view of the embodiment of a support according to the present invention.
Figure 5:
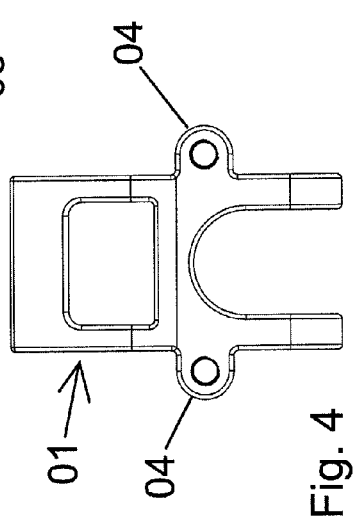
FIG. 5 is a bottom plan view of the embodiment of a support according to the present invention.

The new constructive form applied to the support (01) for assembling the tilting bearings comprises the arrangement of multiple and contiguous openings (02 and 03) practiced on its upper portion, so as to allow the use, by means of fastening elements (not shown), of different diameters and different inter centers. Alternatively, the multiple and contiguous openings (02 and 03) can be of analogous conformation and not contiguous, without, however, abandoning the scope of best use proposed for the support (01) for assembling the tilting bearings, so as to allow the desirable interchangeability among different brands and models of agricultural equipment.

The new constructive form of the support (01) further foresees the arrangement of hollow ears (04) at opposite side ends, to receive methods of fastening a protective cover (not shown) which surrounds the lower part of the set of agricultural bearing and protects it from intense wear on its lower portion, if the owner wishes to make use of said accessory.

The support (01) also has the arrangement of openings (05) practiced on its lower ends, preferably with recesses (06) tied in one of the ends of the fastening methods (07) for their retention at the tilting bearing.

That which is claimed is:

1. A support for assembling agricultural tilting bearings comprising:

a substantially planar upper portion defining a pair of elongated openings, each elongated opening formed by the merger of at least two circular openings of different diameters and extending entirely through the upper portion of the support; and a first axis, wherein said circular openings have centers disposed on the first axis;

opposing fastening sides, each fastening side projecting from one of two opposing ends of the upper portion and terminating at respective lower ends, wherein a pair of holes is defined in each lower end of each fastening side;

a second axis, perpendicular to the first axis;

wherein the upper portion defines a top of a cavity and entirely extends across the cavity in both a first direction, parallel to the first axis, and a second direction, parallel to the second axis;

the opposing fastening sides define two opposing sides of the cavity;

wherein the pair of elongated openings oppose one another and are equidistant from respective opposing ends of the upper portion;

wherein each lower end of each fastening side defines a U-shaped channel;

wherein the holes in each lower end are concentric and are configured to receive a fastening mechanism;

wherein one of the holes in each lower end is counterbored;

wherein an aperture is defined in each fastening side between the lower ends of each fastening side and the upper portion of the support, such that the apertures are aligned with one another along the first direction and extend through the respective fastening sides.

2. The support of claim 1, wherein each fastening side comprises a pair of ears disposed on opposite sides of the fastening side.

3. The support of claim 2, wherein each pair of ears extends in the second direction.

4. The support of claim 3, wherein a hole, extending parallel to the first axis, is defined in each ear.

5. The support of claim 1, wherein the holes defined in the lower ends of the fastening sides extend in the second direction.

6. The support of claim 1, wherein the elongated openings are wider than a diameter of a smaller of the two circular openings.

7. The support of claim 1, wherein a length, parallel to the first axis, of each of the elongated openings is greater than a radius of the larger of the two circular openings.

8. The support of claim 1, wherein a plane of symmetry is defined equidistant from respective lower ends of the opposing fastening sides, equidistant from the opposing ends of the upper portion and perpendicular to the first axis and parallel to the second axis, such that the support is reflectively symmetric across the plane of symmetry.

9. The support of claim 1, wherein the counterbore in each fastening side is complementary to the shape of the fastening mechanism.

* * * * *